(12) United States Patent
Gong et al.

(10) Patent No.: US 12,063,948 B2
(45) Date of Patent: Aug. 20, 2024

(54) METHOD AND SYSTEM FOR FOODSERVICE WITH INSTANT FEEDBACK

(71) Applicant: SKOOPIN INC., San Jose, CA (US)

(72) Inventors: Fengmin Gong, Los Altos Hills, CA (US); Weijun Zhang, San Jose, CA (US); Min Fan, Bellevue, WA (US); Jun Du, Cupertino, CA (US)

(73) Assignee: SkoopMagic, Inc., Cupertino, CA (US)

( * ) Notice: Subject to any disclaimer, the term of this patent is extended or adjusted under 35 U.S.C. 154(b) by 429 days.

(21) Appl. No.: 17/522,728

(22) Filed: Nov. 9, 2021

(65) Prior Publication Data

US 2023/0145313 A1 May 11, 2023

(51) Int. Cl.
*A23L 33/00* (2016.01)
*G06F 18/214* (2023.01)
*G06F 18/25* (2023.01)
*G06N 20/20* (2019.01)
*H04L 67/306* (2022.01)
*H04L 67/50* (2022.01)

(52) U.S. Cl.
CPC ............ *A23L 33/30* (2016.08); *G06F 18/214* (2023.01); *G06F 18/251* (2023.01); *G06N 20/20* (2019.01); *H04L 67/306* (2013.01); *H04L 67/535* (2022.05)

(58) Field of Classification Search
CPC ........ G06N 20/20; G06N 3/08; G06F 18/214; A23L 33/30; G06V 20/52; G06V 20/68
See application file for complete search history.

(56) References Cited

U.S. PATENT DOCUMENTS

| | | | | |
|---|---|---|---|---|
| 9,349,297 | B1* | 5/2016 | Ortiz | G06V 10/761 |
| 10,593,425 | B1* | 3/2020 | Truscott | G16H 20/13 |
| 2020/0408588 | A1* | 12/2020 | Gregory | A47G 23/12 |

* cited by examiner

*Primary Examiner* — John R Wallace
(74) *Attorney, Agent, or Firm* — Sheppard Mullin Richter & Hampton LLP

(57) ABSTRACT

Methods, systems, and apparatuses, including computer programs encoded on computer storage media, for automated foodservice are described. An example method includes receiving one or more images from one or more cameras capturing a food container comprising a plurality of compartments; determining, using a first machine learning model based on the one or more images, a user action comprising a user taking food from a first compartment of the plurality of compartments; receiving a plurality of pieces of weight sensor data from a plurality of weight sensors coupled to a frame hosting the food container; determining, using a second machine learning model based on the plurality of pieces of weight sensor data, a second compartment of the plurality of compartments; in response to the first compartment being the same as the second compartment, displaying the weight and the food information of the food taken by the user.

18 Claims, 8 Drawing Sheets

METHOD AND SYSTEM FOR FOODSERVICE WITH INSTANT FEEDBACK

TECHNICAL FIELD

The disclosure generally relates to systems and methods for food servicing, specifically, an Artificial Intelligence (AI) assisted multi-sensor Internet-of-Things (IoT) system for food servicing with instant feedback, including one or more of the followings: portion-based nutrition and/or cost, portion size, allergen, or other suitable information.

BACKGROUND

Traditional foodservice requires intensive human involvement and lacks precise portion control, instant feedback (e.g., nutrition data report and recommendation), and data analytics. It is desirable to employ IoT systems along with artificial intelligence and machine learning to provide instant and precise food information (such as portion-based nutrition and/or cost, portion size, allergen, or other suitable information) to users, so that users can adjust their behaviors.

SUMMARY

Various embodiments of the present specification may include systems, methods, and non-transitory computer-readable media for IoT-based foodservice automation with instant nutrition feedback.

According to a first aspect, an Internet of Things (IoT) system for foodservice is described. The system may include: a frame having a plurality of weight sensors distributed at corners of the frame. The frame is configured to receive a food container comprising a plurality of compartments. The system may further include one or more two-dimensional (2D) or three-dimensional (3D) cameras comprising one or more of the following: a depth sensor, a time of flight (ToF) camera, or a Light Detection and Ranging (LiDAR) camera. The one or more cameras are directed to the food container to monitor the food container. The system may further include one or more processors coupled to the plurality of weight sensors and the one or more cameras. The one or more processors are configured to: receive one or more images from the one or more cameras capturing the food container; determine, using a first machine learning model based on the one or more images, a user action comprising the user taking food from a first compartment of the plurality of compartments; receive a plurality of pieces of weight sensor data from the plurality of weight sensors coupled to the frame; determine, using a second machine learning model based on the plurality of pieces of weight sensor data, a second compartment of the plurality of compartments from which the user has taken food and a weight of the food taken by the user; obtain food information of food stored in each of the plurality of compartments in the food container; and in response to the first compartment being the same as the second compartment, display the weight of the food taken by the user and the food information of the food stored in the first compartment on a first display panel.

In some embodiments, the user action further comprises one or more of the following: lifting a serving utensil from the food container, stirring the food using the serving spoon, dropping food into the food container, or placing the serving utensil back into the food container.

In some embodiments, to determine the second compartment from which the user has taken food and the weight of the food taken by the user, the one or more processors are configured to: construct a plurality of weight fluctuation patterns respectively based on the plurality of pieces of weight sensor data; adjust the plurality of weight fluctuation patterns based on the user action, wherein the plurality of adjusted weight fluctuation patterns indicate a plurality of weight changes at a plurality of corners of the food container; and feed the plurality of adjusted weight fluctuation patterns to the second machine learning model, wherein the second machine learning model is a pattern recognition model trained to determine, based on a plurality of weight changes at a plurality of corners of the food container, (1) the weight of the food taken out from the food container and (2) one of the plurality of compartments from which the food was taken.

In some embodiments, to construct the plurality of weight fluctuation patterns based on the weight sensor data, the one or more processors are configured to: identify a start timestamp and a completion timestamp of the user action; and construct the plurality of weight fluctuation patterns based on the weight sensor data collected between the start timestamp and the completion timestamp.

In some embodiments, the food information comprises one or more of the following: a name; ingredient information; nutrition information; pricing information; or allergen information.

In some embodiments, the one or more processors are further configured to: determine portion-based food information of the food taken by the user based on the weight of the food taken by the user and the food information of the food stored in the first compartment; and display the portion-based food information.

In some embodiments, the food information comprises one or more pieces of per-weight-unit food information of the food, and to determine the portion-based food information, the one or more processors are configured to: determine the portion-based food information by multiplying the weight of the food taken by the user and each of the one or more pieces of food information of the food.

In some embodiments, to obtain the food information of food stored in each of the plurality of compartments in the food container, the one or more processors are configured to: obtain an identification of food stored in each of the plurality of compartments from a user selection on a display panel that is inaccessible to the user; and retrieve, based on the identification of the food, the corresponding food information.

In some embodiments, to obtain the food information of food stored in each of the plurality of compartments in the food container, the one or more processors are configured to: obtain a plurality of labeled images of food as training data; train, using a supervised training algorithm, a neural network based on the training data for food identification; obtain an identification of the food in each of the plurality of compartments by feeding the one or more images into the trained neural network; and retrieve, based on the identification of the food, the corresponding food information.

In some embodiments, the one or more processors are further configured to: identify a layout of the plurality of compartments in the food container based on the one or more images; and display the food information of the food in the plurality of compartments according to the layout of the plurality of compartments.

In some embodiments, the one or more processors are further configured to: identify a layout of the plurality of compartments in the food container based on the one or more images; and display the food information of the food in the plurality of compartments according to the layout of the plurality of compartments.

In some embodiments, the one or more processors are further configured to: in response to the first compartment being different from the second compartment, select one compartment from the first compartment and the second compartment based on respective confidence scores; determine portion-based food information of the food taken by the user based on the weight of the food taken by the user and the food information of the food stored in the selected compartment; and display the weight of the food taken by the user and the portion-based food information of the food taken by the user.

In some embodiments, the one or more processors are further configured to: if the selected compartment is the first compartment: collect the weight sensor data as new training data; label the new training data with the selected compartment; and retrain the second machine learning model based on the new training data.

In some embodiments, the one or more processors are further configured to: if the selected compartment is the second compartment: collect the one or more images as the new training data; label the new training data with the selected compartment; and retrain the first machine learning model based on the new training data.

In some embodiments, the system further comprises: a first radio-frequency identification (RFID) reader configured to read tag data from an RFID tag associated with a user account. The one or more processors are further configured to: receive the tag data when the RFID tag is scanned by the first RFID reader; and store, based on the tag data, the weight and the portion-based food information of the food taken by the user into the user account.

In some embodiments, the system further comprises: a second RFID reader. The one or more processors are further configured to: receive the tag data when the RFID tag is scanned by the second RFID reader; retrieve, from the user account, all information of the food that has been taken by the user; and display the retrieved information on a second display panel corresponding to the second RFID reader.

In some embodiments, the system further comprises: one or more temperature sensors coupled to the frame. The one or more processors are further configured to: receive temperature sensor data from the one or more temperature sensors; and compensate the weight sensor data based on the temperature sensor data.

In some embodiments, the system further comprises: one or more humidity sensors coupled to the frame. The one or more processors are further configured to: receive humidity sensor data from the one or more humidity sensors; and compensate the weight sensor data based on the humidity sensor data.

According to a second aspect, a computer-implemented method is described. The method may include: receiving, by a computer, one or more images from one or more cameras capturing a food container comprising a plurality of compartments; determining, by the computer using a first machine learning model based on the one or more images, a user action comprising a user taking food from a first compartment of the plurality of compartments; receiving, by the computer, a plurality of pieces of weight sensor data from a plurality of weight sensors coupled to a frame, wherein the frame is configured to receive the food container; determining, by the computer using a second machine learning model based on the plurality of pieces of weight sensor data, a second compartment of the plurality of compartments from which the user has taken food and a weight of the food taken by the user; obtaining, by the computer, food information of food stored in each of the plurality of compartments in the food container; and in response to the first compartment being the same as the second compartment, displaying, by the computer, the weight of the food taken by the user and the food information of the food stored in the first compartment on a first display panel of the computer.

According to a third aspect, a non-transitory computer-readable storage medium is described. The storage medium may be configured with instructions executable by one or more processors to cause the one or more processors to perform operations including: receiving one or more images from one or more cameras capturing a food container comprising a plurality of compartments; determining, using a first machine learning model based on the one or more images, a user action comprising a user taking food from a first compartment of the plurality of compartments; receiving a plurality of pieces of weight sensor data from a plurality of weight sensors coupled to a frame, wherein the frame is configured to receive the food container; determining, using a second machine learning model based on the plurality of pieces of weight sensor data, a second compartment of the plurality of compartments from which the user has taken food and a weight of the food taken by the user; obtaining food information of food stored in each of the plurality of compartments in the food container; and in response to the first compartment being the same as the second compartment, displaying the weight of the food taken by the user and the food information of the food stored in the first compartment on a first display panel These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

The description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present specification. Thus, the specification is not limited to the embodiments shown but is to be accorded the widest scope consistent with the principles and features disclosed herein.

Traditional foodservices may often lack precise portion control, instant feedback, and automated management and operational analytics.

Precise Portion Control

Precise portion control is important in a healthy diet. Traditional foodservice models do not provide customers with viable means to precisely control the amount of food for consumption. A regular restaurant may, at best, provide a coarse-grained size configuration for their dishes, such as small, medium, and large. In a cafeteria setting where the customers serve themselves or are served by a servant at a counter, the amount of food placed on a customer's plate is usually based on experience and estimation.

Instant Feedback

Some foodservice providers may offer nutrition information being served. However, this information is usually estimated based on pre-configured portion sizes. In a self-serve cafeteria or a buffet, when a customer scoops a random amount of food, he or she may be unable to obtain the precise nutrition information such as amount of calories, protein, sugar, or carbohydrate contained in the food from the cafeteria or its employees.

Automated Management and Operational Analytics

A simple example of management in a cafeteria or buffet setting may involve observing the consumption rate of different food and monitoring the remaining amount of food in the food containers. Traditionally, these tasks may be performed by employees and thus often inaccurate or delayed. In addition, operational analytics allows restaurants to process various types of information from different sources and then decide what to do next. However, this information is usually input by human operators and thus lacks accuracy.

In this disclosure, an internet of things (IoT) system is designed to address the above issues and beyond. This IoT system interrelates computing devices, mechanical and digital sensors and machines, objects, and the ability to transfer data over a network without requiring human-to-human or human-to-computer interaction.

Figure 1A:
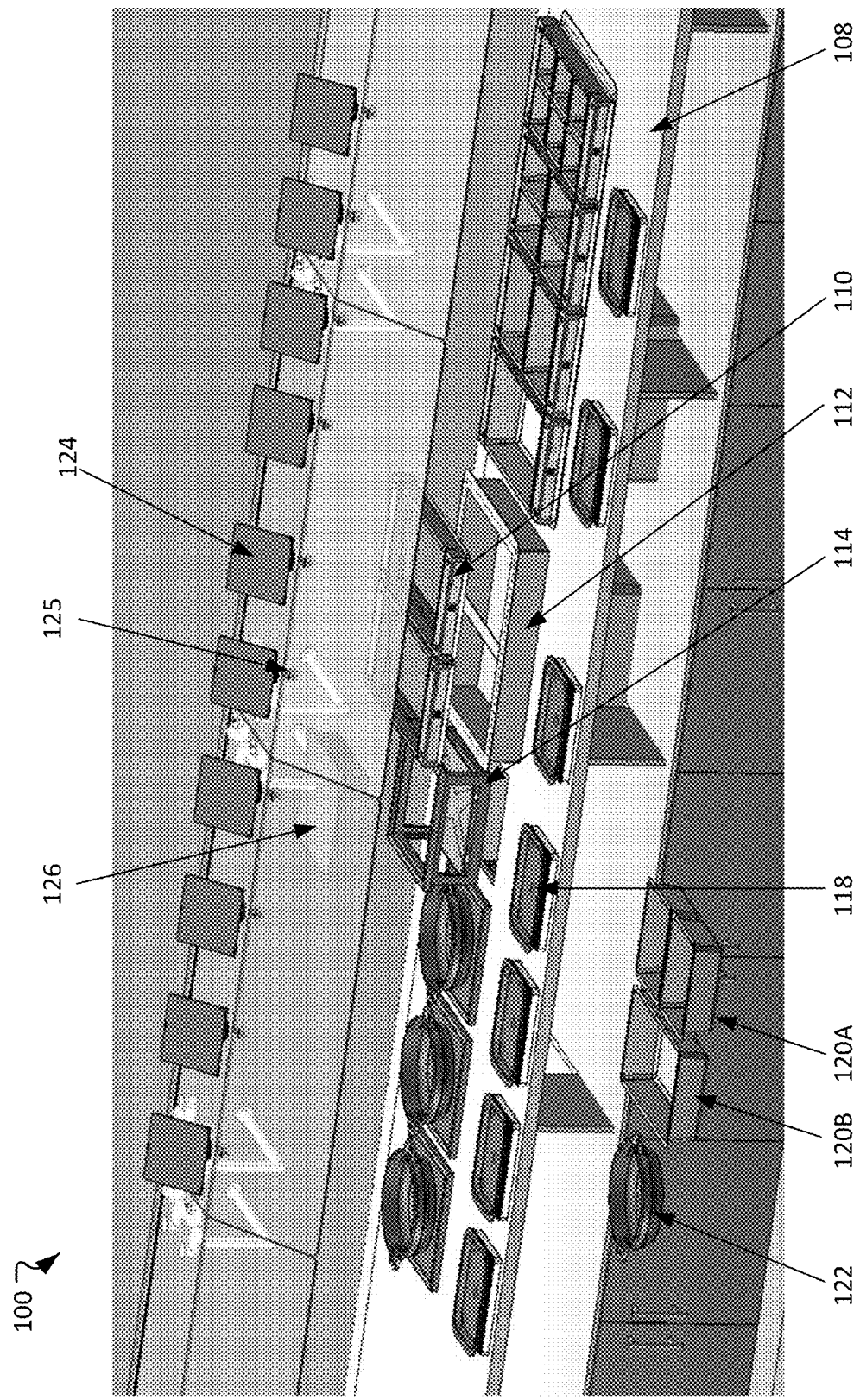
FIG. 1A illustrates an exemplary environment for IoT-based foodservice automation in accordance with some embodiments.

FIG. 1A illustrates an exemplary environment 100 for IoT-based foodservice automation in accordance with some embodiments. The environment 100 is intended to illustrate a foodservice providing station, which may be found in a cafeteria, a buffet, or other suitable settings in which a user (a customer) serves him/herself or is served by an operator (an employee of the foodservice provider). The various configurations in the environment 100 are merely for illustrative purposes, and do not limit the application of the to-be-described IoT system to other suitable configurations or other environments.

As shown in FIG. 1A, station 108 may include a plurality of openings for hosting food wells 112 and/or induction stoves, cookers, or warmers 126. The food well 112 may host food containers such as Bain-marie pans 120A or 120B. The food well 112 may be hot or cold in order to keep the food in the pans 120A or 120B warm or cold. Each food well may host one or more pans at a time, and each pan 120A or 120B may have different configurations. For example, pan 120A has two separate compartments or sections, while pan 120B has only one compartment or section. The induction stove, cooker, or warmer 126 may host a food container such as a pan 122 to keep the food warm.

In environment 100, an IoT system may be deployed to automate the foodservice experience and provide precise portion control and instant feedback to the users. In some embodiments, the IoT system may include a frame 110 or 114 coupled with one or more weight sensors such as load cell sensors, a radio-frequency identification (RFID) reader 118 configured to read tag data from an RFID tag associated with a user account, one or more sensors 125 for detecting and identifying user actions, and one or more computing devices (not shown in FIG. 1A).

In some embodiments, the one or more load cell sensors may be attached to (e.g., on the upper surface or the lower surface) or built-in the frame 110 or 114 to monitor the weight of the food container directly or indirectly placed on top of the frame 110 or 114. The number and placement of load cells may be customized according to the actual use. For example, frame 114 may receive the induction stove/cooker/warmer 126, which hosts a single-compartment food container 122. In this case, frame 114 may be coupled to one load cell at the center of the bottom to monitor the weight of the food in the food container 122.

As another example, frame 110 may receive a multi-compartment pan 120A, and the multiple compartments in the pan 120A may store different food. Since the IoT system is to provide as much information about the food being taken by a user from the pan 120A, the frame 110 may be configured with multiple load cells to, not only monitor the weight changes of the pan 120A, but also approximately identify the compartment from which the food was being taken based on the weight sensor data collected by the load cells. Based on the identified compartment and the food information of the different food stored in the different compartments, the IoT system may provide a more accurate description of the food taken by the user. In some embodiments, the food information may be received from user input (e.g., input by an employee or an operator), or learned by machine learning models based on 3D images/videos captured by cameras. More details about learning the food information may be referred to FIG. 3 and FIG. 4.

In some embodiments, the RFID reader 118 may be installed at a proper place on station 108 for users to scan RFID tags. For example, the RFID tag may be attached to or built-in to a food tray. When a user places the food tray on the RFID reader 118, the tag data read from the RFID tag may be deemed as an identifier associated with a user account corresponding to the user. As another example, the RFID tag may be built in an employee badge, a card, a wristband, a mobile phone, a smartwatch, or another suitable device or object that is associated with the user. In some embodiments, all information related to the food taken by a user at a first section of the station 108 may be stored and associated with the user (e.g., with its user account), and displayed on a display panel 124. When the user moves to a second section of station 108 to take food, the previously stored information may be retrieved and displayed along with the food that the user just took from the second station. This way, the user can view all information of the list of food that he or she has taken so far.

In some embodiments, the IoT system may include a plurality of display panels respectively corresponding to the RFID readers. When an RFID reader 118 reads the tag data from an RFID tag associated with a user (e.g., via the food tray held by the user or a badge/card possessed by the user), the information of the food that the user has taken so far may be displayed at the display panel corresponding to the RFID reader 118. In other embodiments, the display panel may refer to a display of the user's smart device (e.g., phone, watch, glasses). That is, the information of the food that the user has taken so far may be displayed on the user's smart device.

In some embodiments, the RFID reader 118 may include a reader and an antenna that are electrically connected. The reader may be installed anywhere on station 108, while the antenna may be installed at the place labeled as 118 in FIG. 1A.

In some embodiments, the one or more sensors 125 may include motion sensors, light sensors, depth-sensing sensors, time of flight (ToF) cameras, or Light Detection and Ranging (LiDAR) cameras, and other suitable sensors. For example, a motion sensor or a light sensor may be installed corresponding to one foodservice section (e.g., a section hosting a food well 112 or an induction stove/cooker/warmer 114) of station 108. The motion sensor or the light sensor may detect user actions including a user approaching or leaving the foodservice section. These user actions may compensate the weight sensor data collected by the load cell sensors on the frame (110 or 114) to determine the amount of food taken by a user.

For example, the load cell sensors on the frame (110 or 114) may continuously collect weight readings at millisecond intervals before, during, and after a user takes food from the food container (120A, 120B, or 122). The sequence of continuous weight readings may be constructed as a weight fluctuation pattern, such as a weight-changing curve in the time dimension. The user actions detected by the motion sensor or the light sensor may help determine the start and completion of a user's food-taking action on the weight-changing curve. This is helpful to improve the accuracy of the weight measurement especially when the food container is subject to fluid sloshing (e.g., when the food is in a liquid form), material agitation or mixing (e.g., stirring), internal chemical reactions (e.g., caused by the heat from the grill, or frying pan, and the toaster, breaks down food's proteins into amino acids), vibration caused by surrounding environment (e.g., loud music or vibration bass), or other situations where the weight readings of the food container may not be stabilized.

While the motion or light sensors may detect simple user actions such as a user approaching or leaving station 108, in some embodiments, more sophisticated AI cameras may be deployed as the sensors 125 to capture more informative visual information. For example, ToF cameras or LIDAR cameras may be used to capture 3D point cloud images of station 108 and user actions. A ToF camera is a range imaging camera system employing time-of-flight techniques to resolve distance between the camera and the subject for each point of the image, by measuring the round trip time of an artificial light signal provided by a laser or an LED. ToF cameras are part of a broader class of scannerless LIDAR, in which the entire scene is captured with each laser pulse, as opposed to point-by-point with a laser beam such as in scanning LIDAR systems.

In some embodiments, the AI cameras deployed as sensors 125 may be configured to monitor the foodservice sections on station 108. For example, each AI camera may monitor one or more food containers (120A, 120B, and 122). In some embodiments, the AI camera may capture 2D or 3D images of the food container and the user operating at the food container.

For example, the images captured by the AI cameras covering the food container may be fed into various pre-trained machine learning models to identify (1) the configuration of the food container (e.g., a number of compartments in the food container, a layout of the compartments in the food container), (2) status of the food in the food container (e.g., the remaining amount of food in each compartment in the food container), (3) the name or identification of the food in each compartment in the food container, (4) the food ingredients in each compartment in the food container. As an example, the layout of the compartments in the food container may be identified by inputting an image of the food container into a machine learning model trained based on labeled images covering all known food container configurations (e.g., usually between 1 to 8 compartments). As another example, an image of the food container may go through a neural network to detect the dividers and edges in the food container that form the compartments. The number of locations of the dividers and edges may be matched against known food container configurations to determine the configuration of the present food container. Based on the layout of the compartments and the weight readings from the load cells, the IoT system may more accurately determine the specific compartment from which the food was taken and the amount of food that was taken. These machine learning models may include knowledge-based (e.g., rule-based) models, or neural networks or decision trees trained based on labeled training data. More details related to these machine learning models may refer to FIG. 3.

As another example, the images captured by the AI cameras covering users operating at the food container may be fed into another machine learning model to identify user actions. This machine learning model may be implemented as neural networks trained with supervised learning methods and based on labeled training data. The user actions may include: lifting a serving utensil from a first compartment within a multi-compartment food container, taking food using the serving utensil from the first compartment, dropping food back to the first compartment, stirring food, placing the serving utensil back to the first compartment of the multi-compartment pan, or placing the serving utensil back to a second compartment of the multi-compartment pan, etc. In some embodiments, these identified user actions may compensate the weight readings collected by the load cells on the frame (110 or 114) in determining the weight fluctuation pattern. For example, if it is detected that the user moves the serving utensil from one compartment to another compartment, the weight changes caused by the serving utensil movement may be taken into consideration to adjust the estimated weight of the food taken by the user (e.g., the weight reduction at the first compartment minus the weight addition at the second compartment may be determined as the weight of food taken by the user).

As yet another example, the images captured by the AI cameras covering the food being served in the food container may be used for food identification. By identifying the food, detailed food information may be retrieved. Such detailed food information may include name, ingredient information, nutrition information, pricing information, and/or allergen information. Based on the detailed food information and the estimated weight of the food taken by a user, the IoT system may provide customized information for the user, such as the calories/protein/sugar/carbohydrate amount contained in the portion taken by the user. In some embodiments, the customized information may be analyzed by a corresponding mobile application or a server, which may make recommendations on adjusting the food (e.g., reducing certain ingredients, adding other ingredients, reducing/adding amount). In some embodiments, the AI cameras may further identify the ingredients in the food in order to provide even more accurate dietary information. For example, a scoop of potato beef may be further identified by the AI camera to estimate the respective portions of the beef and potato, so that more accurate ingredient and nutritional information may be determined based on the portions and known nutrition information about beef and potato. In another example, a compartment may contain multiple types of food—e.g. sushi or sandwiches of different ingredients. While the weight of each piece of the food (sushi or sandwiches) is similar, the AI cameras may help determine the ingredients in the piece taken from the compartment using the machine learning model for food identification recognition (e.g., a sandwich with a large portion of the ingredient in red color may have a higher probability to be identified as a beef sandwich, while a sandwich with a large portion of the ingredient in white color may have a higher probability to be identified as a turkey sandwich). In some embodiments, the AI cameras may also detect empty pans or compartments in a pan and inform the operators to refill, and detect anomalies (e.g., spilled food) and send corresponding notifications to the operators.

In some embodiments, the one or more computing devices (not shown in FIG. 1A) of the IoT system may provide the computation power and storage capacity for implementing the above-described functionalities. The computing devices may include on-prem servers, remote servers, cloud servers, and may be implemented in one or more networks (e.g., enterprise networks), one or more endpoints, one or more data centers, or one or more clouds. The computing devices may include hardware and/or software that manages access to a centralized resource or service in a network. In some embodiments, the computing devices may be electronically coupled to the load cell sensors on the frames (110 and 114) through micro-controller units (e.g., a small computer on a single metal-oxide-semiconductor integrated circuit chip), the RFID readers 118 via BLUETOOTH™ or USB, the sensors 125 via wired or wireless connections, and the display panels 124.

Figure 1B:
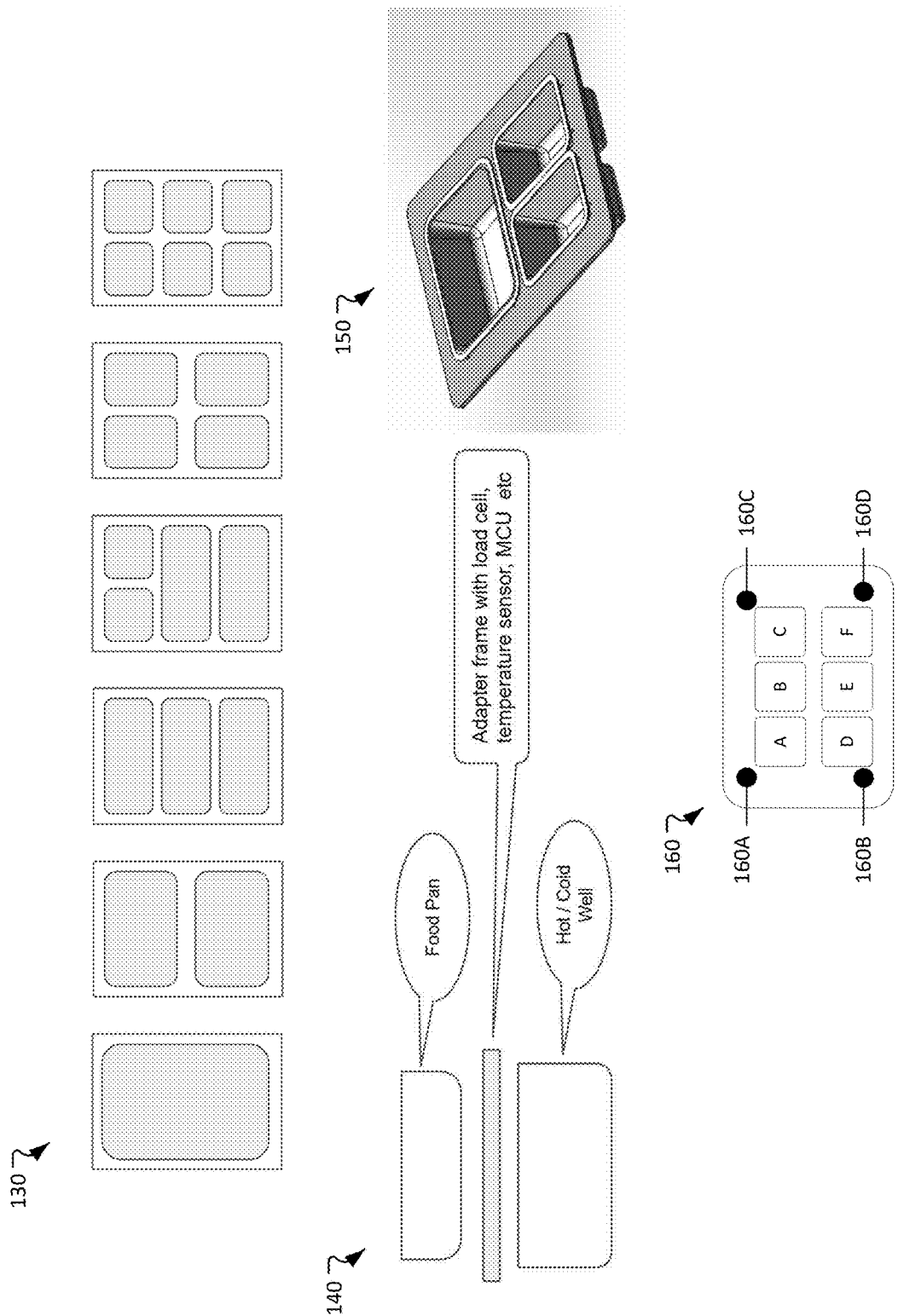
FIG. 1B illustrates exemplary food container configurations supported by IoT-based foodservice automation in accordance with some embodiments.

FIG. 1B illustrates exemplary food container configurations supported by IoT-based foodservice automation in accordance with some embodiments. The food container configurations shown in FIG. 1B are for illustrative purposes only, other suitable configurations may be contemplated by the person skilled in the art.

As shown in section 130 of FIG. 1B, a food container may have various compartment configurations. When the food container has two or more compartments serving different food, the IoT system may need to determine the compartment from which a user is taking food in order to provide accurate food information (e.g., weight, nutrition information) to the user.

Section 140 of FIG. 1B illustrates a configuration often seen in a cafeteria or buffet, which is a combination of a food pan (e.g., a food container), a frame of the IoT system (e.g., 110 and 114 in FIG. 1A), and an optional hot/cold well. In some embodiments, the frame of the IoT system may be equipped with not only load cell sensors for measuring weights, but also temperature sensors and humidity sensors for capturing temperature and humidity readings. The capturing temperature and humidity readings may be used to compensate for the weight readings when the temperature is beyond the normal operating range of the load cell sensors. Similarly, a hot well may generate steam affecting the weight readings from load cell sensors. The compensation operations may include applying a percentage to the load cell readings based on a degree of temperature and/or humidity change. Section 150 of FIG. 1B illustrates a 3D diagram of the combination, which may be appreciated as three single-compartment pans placed on top of the IoT frame, or one three-compartment pan placed on top of the IoT frame.

Section 160 of FIG. 1B illustrates a distributed placement of the load cell sensors on a frame holding a six-compartment pan. As shown, the load cell sensors 160A-D may be placed at the corners of the frame. The weight readings from the load cell sensors 160A-D may be constructed as respective fluctuation curves/patterns. These fluctuation curves/patterns may reflect the weight changes occurring at the four corners of the frame during a period of time. These weight changes along with the knowledge of the layout of the compartments may allow the IoT system to determine the compartment from which a user has taken food. For instance, a comparison of the weight changes between 160A and 160B may indicate the row of the compartments (ABC or DEF) from which the food was taken, and a comparison of the weight changes between 160A and 160C may indicate the column of the compartments (AD, BE, or CF) from which the food was taken. Based on the row and column information, the specific compartment may be determined as the location from which the food was taken.

In some cases, the weight changes are not discrete changes (e.g., when the food is liquid, the weight change may not be stabilized in a short period of time) but a sequence of continuous weight readings. The continuous weight readings collected by the load cell sensors may be constructed as respective weight fluctuation patterns/curves. In some embodiments, the weight readings may be affected by noisy output from the fluctuation of changing force. Mathematics and machine learning based filtering may be performed to transform the signal to a measurable and interpretable form. A machine learning model may receive the weight fluctuation patterns/curves as input, and automatically identify the compartment from which the food is likely taken. The machine learning model may be trained by labeled weight fluctuation patterns for different types of food. The training data may be created by domain knowledge and simulations.

Figure 2:
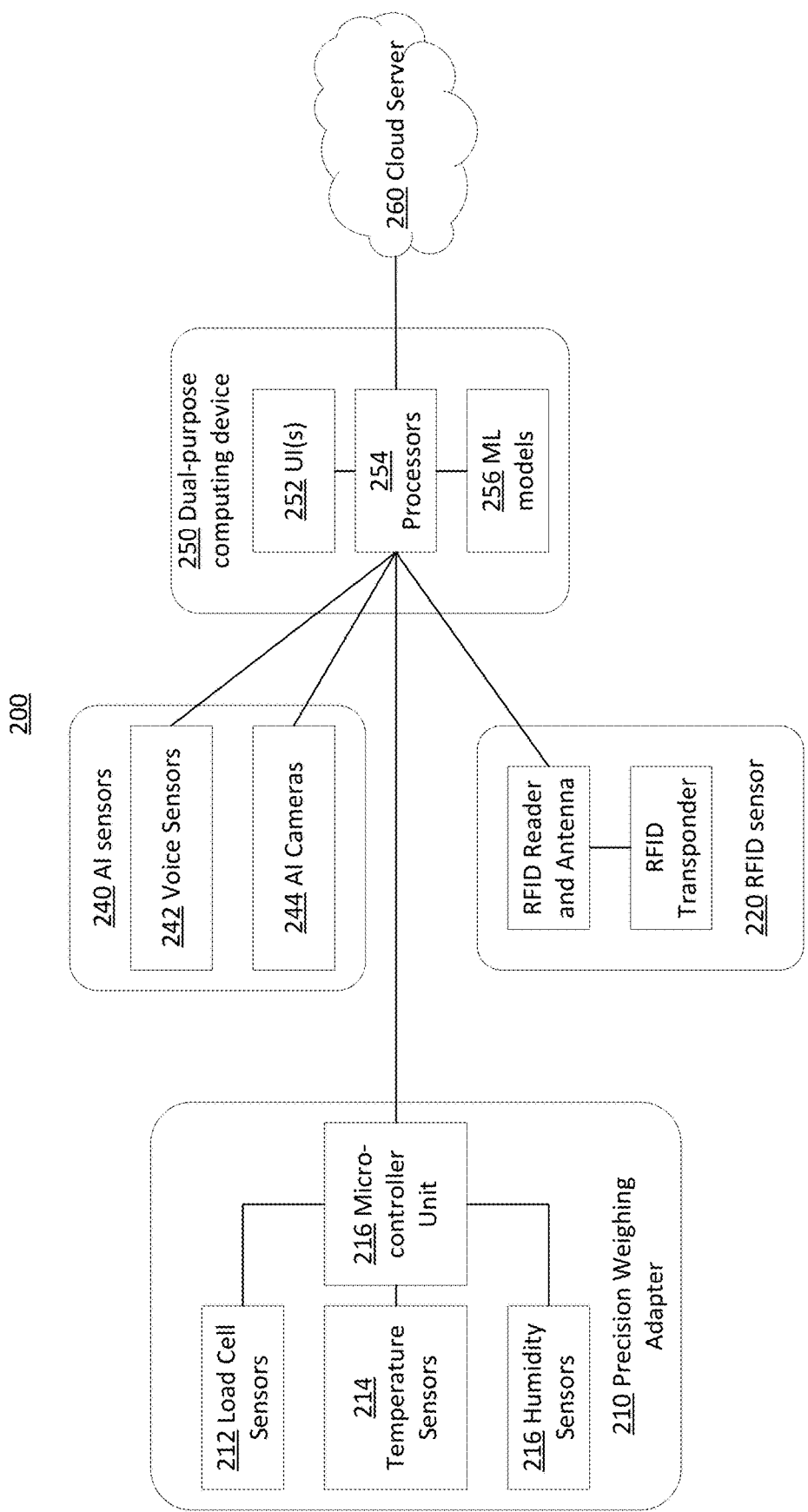
FIG. 2 illustrates an exemplary system diagram of an IoT system for IoT-based foodservice automation in accordance with some embodiments.

FIG. 2 illustrates an exemplary system diagram of an IoT system 200 for IoT-based foodservice automation in accordance with some embodiments. The system diagram 200 may be appreciated as a component diagram of the IoT system illustrated in FIG. 1A. The components of the IoT system 200 in FIG. 2 are for illustrative purposes, which may include fewer, more, or alternative components depending on the implementation.

In some embodiments, the IoT system 200 may include five groups of hardware devices as shown in FIG. 2: a precision weighing adapter 210 (corresponding to the frame 110 and 114 in FIG. 1A), AI sensors 240 (corresponding to the sensors 125 in FIG. 1A), RFID sensor 220 (corresponding to the RFID reader/antenna 118 in FIG. 1A), a dual-purpose computing device 250, and a cloud server 260.

In some embodiments, the precision weighing adapter 210 may include one or more load cell sensors 212, temperature sensors 214, and humidity sensors 216. The number and layout of the load cell sensors 212 may be configured according to the type of food container that the precision weighing adapter 210 supports. For example, the precision weighing adapter 210 may be a rectangular shape frame with an opening and is configured to receive a rectangular food container when the food container is lowered into the opening of the frame. In this case, four load cell sensors 212 may be distributed at four corners of the frame to monitor the weight changes occurring at the four corners of the food container. As another example, if the precision weighing adapter 210 is configured to support a single-compartment food container serving one type of food, one load cell sensor 212 may be sufficient to monitor the weight change of the food in the food container. In some embodiments, the temperature sensors 214 and the humidity sensors 216 may be installed to compensate/adjust the weight readings of the load cell sensors 212. In some embodiments, a microcontroller unit 216 may be installed on the precision weighing adapter 210 for aggregating and preprocessing the collected sensor data, as well as providing communication means to transmit the sensor data to other components of the IoT system 200.

Besides the sensors on the precision weighing adapter 210, one or more AI sensors 240 may be installed to provide other sensing information from other dimensions. For example, while the sensor data collected by the precision weighing adapter 210 are mainly weight information, an AI camera 244 may be installed to capture visual information related to the food container supported by the precision weighing adapter 210 (e.g., the number and layout of compartments in the food container, food information of the food stored in each of the compartments), and user actions including users approaching or leaving the food container, hand motions such as lifting and putting back a serving utensil (ladle, scoop, pasta server, tong, spatula, etc.), taking food from one of the compartments in the food container, etc. These user actions may be fed into corresponding machine learning models to extract action information, which may be used to compensate or consolidate with the weight information collected by the precision weighing adapter 210. In some embodiments, voice sensors 242 may be installed as an input device for users or operators (e.g., employees of the foodservice provider) to give commands to the IoT system, or as an alternative or additional output interface to the display panel 124 in FIG. 1A.

In some embodiments, RFID sensors 220 may be configured to obtain user information so that the information extracted from the precision weighing adapter 210 and the AI sensors 240 may be associated with the user, thereby providing instant and personalized feedback to the user. In some embodiments, the RFID sensor 220 may include three parts: RFID reader, antenna, and transponder. The transponder refers to an RFID tag that is associated with the user, such as an RFID tag installed on a food tray held by the user, or a badge carried or worn by the user. The RFID reader and antenna are configured to read tag data from the RFID tag. The tag data may be deemed as an identifier corresponding to the user. In some embodiments, the identifier may refer to a user account (e.g., a temporary account just for the current service) created for the user.

In some embodiments, the IoT system 200 may install other types of user identification means, such as Quick Response (QR) code scanner, Near Field Communication (NFC) reader, and other suitable means. For instance, a food tray may have a QR code as an alternative for the RFID tag. If the RFID tag is damaged or the RFID reader/antenna is malfunctioning, the IoT system 200 may trigger the QR code scanner to identify the user or the user account.

In some embodiments, the dual-purpose computing device 250 may refer to one or more computing devices configured with processors 254 for processing the sensor data collected by the precision weighing adapter 210, the AI sensors 240, and the RFID sensor 220, and generating interactive user interface (UI) 252 to present information the users and receiving input from the users. For instance, after identifying a user's user account based on the data collected by the RFID sensor 220, the processors 254 may retrieve the food information of the food that has been taken by the user so far, and display it on the UI 252. In some cases, the IoT system 200 may generate (e.g., via the cloud server 260) a healthy score as an evaluation of the user's meal configuration, and/or recommendations on reducing/adding certain types of food. The depth of interaction with users by this IoT system 200 may further be extended, as an example, to where a user may have a very specific dietary prescription from his/her own healthcare provider, at user's choice and configuration, that prescription is compared in real time to the selection of food offering, and checked against the kinds and amount of food taken by the user, to help the user follow the prescription easily and accurately.

In some embodiments, the dual-purpose computing device 250 may include one or more pre-trained machine learning models 256 for analyzing the sensor data collected by the precision weighing adapter 210 and the AI sensors 240. Details about the machine learning models 256 may refer to FIG. 3.

In some embodiments, the cloud server 260 may be implemented as the centralized brain that collects all the data from different foodservice providers and performs operational analytics, such as extracting trends in food consumptions in certain areas, making predictions for future market needs, and proactively managing inventory replenishment, etc. The cloud server 260 may be configured in a multi-tenant mode to serve different foodservice providers at the same time. The cloud server 260 may also receive notices or error messages of malfunctioning sensors, and send out notices and instructions to local operators for repair. In some embodiments, the local devices of IoT system 200 may send the weight of the food taken by the user, the food information of the food taken by the user, a current time, and an identification associated with the user to the cloud server 260 for dietary data aggregation and tracking. Once obtaining the dietary data, the cloud server 260 may determine a distance between the user's dietary behavior and an optimal dietary behavior. The user's dietary behavior may include the amount and nutrition information of the food taken by the user and the frequency/time (e.g., determined based on the received time information) of food intake actions. The optimal dietary behavior may be obtained as recommended by nutritionists or learned based on dietary data uploaded from sample individuals. The cloud server 260 may make corresponding dietary improvement recommendations to the user based on the distance. The identification associated with the user may be used by the cloud server 260 to aggregate the specific user's information collected from different sources, e.g., from a dining place equipped with the above-described IoT system or another source.

Figure 3:
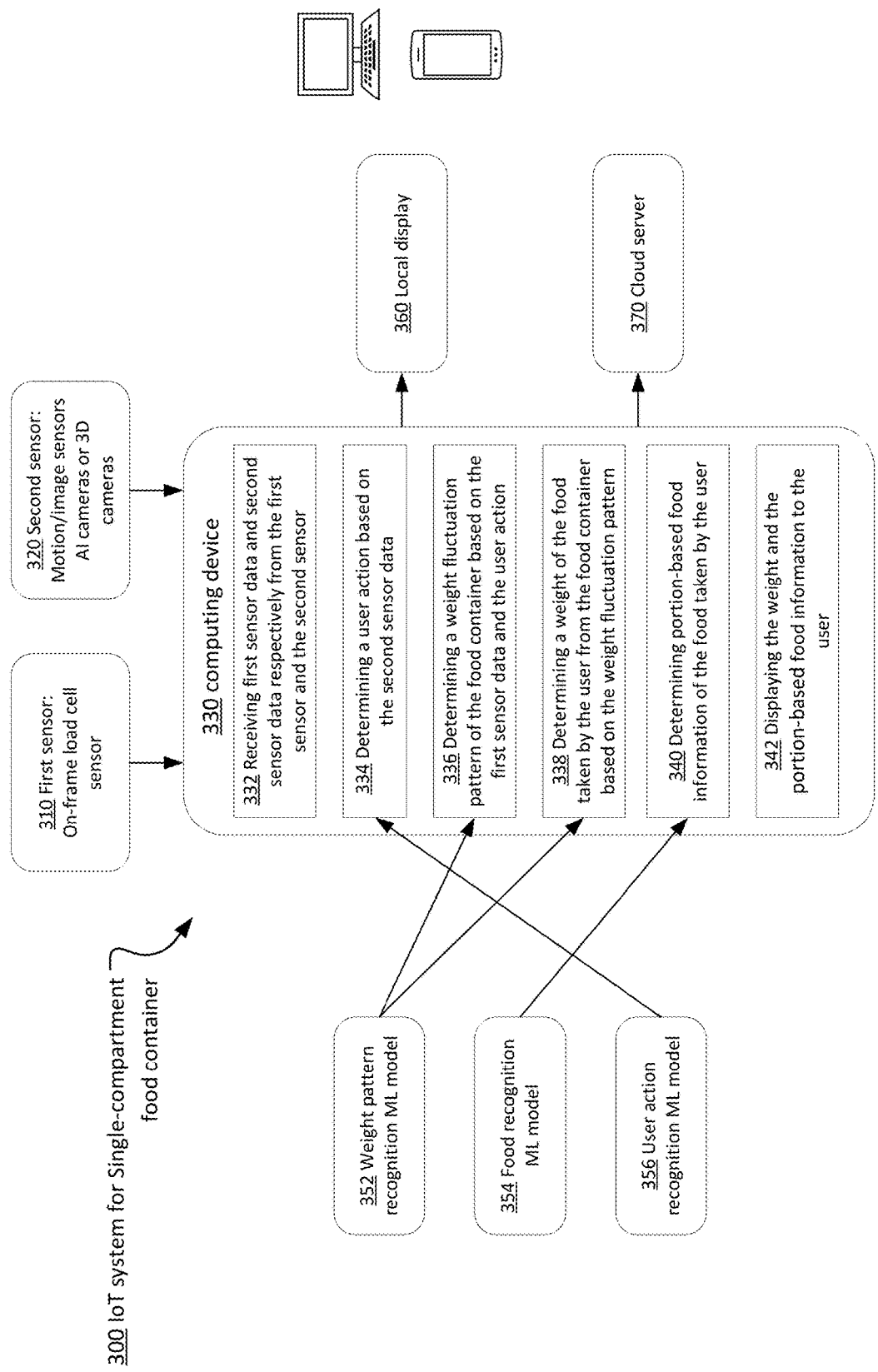
FIG. 3 illustrates an exemplary system diagram of IoT-based foodservice automation for single-compartment food containers in accordance with some embodiments.

FIG. 3 illustrates an exemplary system diagram of IoT-based foodservice automation for single-compartment food containers in accordance with some embodiments. The IoT system 300 in FIG. 3 may be designed to automate food-service and provide precise portion control and instant feedback using IoT sensors and machine learning models. For illustrative purposes, a single-compartment food container is used as an example use case to describe the workflow of the IoT system 300. Depending on the implementation, the IoT system 300 may include fewer, more, or alternative hardware components and software functionalities.

As shown in FIG. 3, the IoT system 300 may include a computing device 330 working as an information processing hub. The computing device 330 may receive input data from first sensors 310 (corresponding to sensors in 210 in FIG. 2) and second sensors 320 (corresponding to the AI sensors 240 in FIG. 2). In some embodiments, these sensors may continuously transmit sensor data at millisecond level to the computing device 330 for the process.

In order to extract meaningful information from the received sensor data, multiple machine learning models may be pre-trained and utilized by the computing device 330 to process the collected sensor data.

In some embodiments, a weight pattern recognition machine learning (ML) model 352 may be trained to receive sequences of weight readings from a plurality of load cell sensors 310 measuring weight changes occurred at the plurality of corners of a food container, embedding the sequences of weight readings into weight fluctuation patterns, identify (based on the weight fluctuation patterns) the compartment in the food container from which the user has taken food, and estimate the weight of the food taken by the user. The weight pattern recognition ML model 352 may be trained with training data collected from experiments, simulations, and generated based on domain knowledge. Each piece of training data may include historical weight readings from load cell sensors 310, and labels indicating the actual compartment from which the food was taken and the weight of the food that was taken. In some embodiments, the weight pattern recognition ML model 352 may be a neural network comprising an embedding layer for embedding the sequences of weight readings from the plurality of load cell sensors 310 into weight fluctuation patterns.

In some embodiments, a food recognition ML model 354 may be trained for food identification based on the visual data collected by the AI cameras 320. The food recognition ML model 354 may be implemented as a neural network comprising one or more feature extraction layers extracting features of the visual data (e.g., 3D images), and an output layer generating predictions of the food based on the extracted features. The visual data may include the images of the food stored in each compartment of a food container. The neural network may be trained based on labeled images of different types of food. In some embodiments, other types of sensors may be installed to help the food recognition ML model to identify the food, such as olfactory receptors (also called smell receptors) and taste sensors.

In some embodiments, a user action recognition ML model 356 may be trained for user action recognition based on the visual data collected by the AI cameras 320. The visual data may include 3D point cloud images of the users with depth information. In some cases, the visual data may focus on hand motions or trajectories of the user. In some embodiments, the user action recognition ML model 356 may include a channel separated neural network, which captures spatial and spatiotemporal features in distinct layers. These features are separately captured by different convolution blocks but aggregated at each stage of convolution. By identifying the user actions, the IoT system 300 may compensate or make corrections to the weight readings from the load cell sensors 310. For instance, when a user lifts a utensil from a compartment, the weight readings may detect the weight reduction and the weight pattern recognition ML model 352 may predict a certain amount of food has been taken from that compartment. However, the user action recognized by the user action recognition ML model 356, i.e., the user takes the utensil at this timestamp, may allow the computing device 330 to adjust the output of the weight pattern recognition ML model 352.

In some embodiments, after the computing device 330 receives first sensor data and second sensor data respectively from the first sensor 310 and the second sensor 320 at step 332, it may determine a user action based on the second sensor data at step 334. For instance, the second sensor data may be fed into the user action recognition ML model 356 to determine a user action. The second sensor data may include motions detected when a user approaches or leaves from the foodservice section, or 3D point cloud images of the user taking food from the single-compartment food container. The output of the user action recognition ML model 356 may include the user's arrival and departure, lifting a serving utensil, taking food using the serving utensil, and placing the serving utensil back.

In some embodiments, the computing device 330 may use the weight pattern recognition ML model 352 to construct a weight fluctuation pattern of the single-compartment food container at step 336 based on the first sensor data and the user action determined by the food recognition ML model 354, and determine a weight of the food taken by the user from the food container based on the weight fluctuation pattern at step 338. For example, the weight fluctuation pattern may be a continuous curve in a time dimension, and the user actions (e.g., user's arrival and departure) generated by the user action recognition ML model 356 may be used to determine which portion of the weight fluctuation pattern may correspond to the particular user. The specific portion of the weight fluctuation pattern may be used by the weight pattern recognition ML model 352 to determine the weight of the food taken by the user. In some cases, the user action determined by the user action recognition ML model 356 may also be used to adjust the weight fluctuation pattern. For instance, the user action recognition ML model 356 may detect that the user lifts the serving utensil from the food container at a first point in time, takes food using the serving utensil, but puts the serving utensil at a plate in front of the food container (not back into the food container). In this case, the weight of the serving utensil may be used to offset the weight reduction in the weight fluctuation pattern at the first point in time. Similarly, if the serving utensil was not in the food container but the user puts it into the food container after taking food at a second point in time, the detected user action may be used to offset the weight addition in the weight fluctuation pattern at the second point in time.

In some embodiments, the computing device 330 may also obtain food information of the food taken by the user based on the second sensor data, such as the images of the food in the food container. The second sensor data may be input into the food recognition ML model 354 trained for image recognition. The output of the food recognition ML model 354 may include an identification of the food based on an image of the food. Based on the identification of the food, the computing device 330 may retrieve corresponding food information such as ingredient information, nutrition information, pricing information, and/or allergen information. In some embodiments, the food recognition ML model 354 may be trained using supervised learning algorithms based on a plurality of labeled food images. In some embodiments, the food information may be received from an operator's input (e.g., a selection from a list of food options/images) on a display panel only accessible to the operator but not the user (e.g., customers).

In some embodiments, the food information of the food may include per-weight-unit food information, such as calories per gram/oz or sugar amount per gram/oz. The computing device may automatically determine a portion-based food information specifically for the portion of food taken by the user at step 340. For example, if the user took 2 oz of food, the portion-based food information may show the user how much calories and sugar are in the 2 oz of food. A simple example includes multiplying the weight of the food taken by the user to the per-weight unit food information.

After automatically obtaining the weight information and the detailed food information of the food taken by the user, the computing device 330 may instantly display the weight information and the portion-based information of the food taken by the user at a local display 360 at step 342. With this instant feedback of weight and nutrition information, user's diet behavior may be adjusted accordingly. The local display 360 may refer to a display panel owned by the foodservice provider, or a terminal display of the user's smart device. For example, the user may install a mobile application of the IoT system 300 on his/her smart device. When the user takes food from the container, the weight and food information may be instantly displayed on his/her smart device.

In some embodiments, all the weight information and portion-based food information may be aggregated into a cloud server 370 for further operational analytics, such as user food-consumption patterns in different geographical areas or in different age groups, the trends of the food preferences, etc. These analytics may guide the foodservice providers to manage their operations more efficiently.

Figure 4:
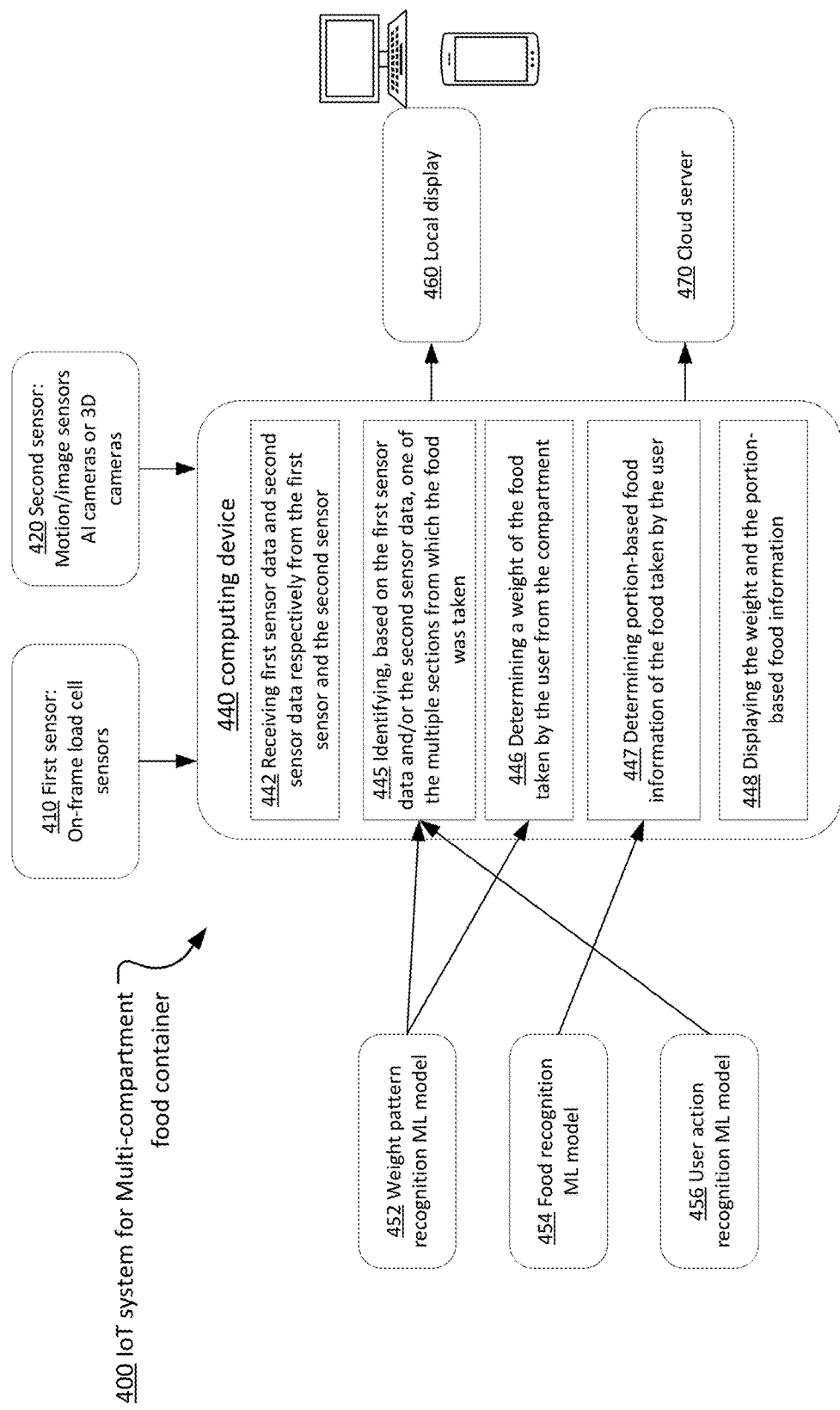
FIG. 4 illustrates an exemplary system diagram of IoT-based foodservice automation for multi-compartment food containers in accordance with some embodiments.

FIG. 4 illustrates an exemplary system diagram of IoT-based foodservice automation for multi-compartment food containers in accordance with some embodiments. The IoT system 400 in FIG. 3 may be designed to automate foodservice and provide precise portion control and instant feedback using IoT sensors and machine learning models. For illustrative purposes, a multi-compartment food container is used as an example use case to describe the workflow of the IoT system 400. Depending on the implementation, the IoT system 400 may include fewer, more, or alternative hardware components and software functionalities, and the steps may be performed sequentially or in parallel, or in a different order.

Similar to the IoT system 300 in FIG. 3, the IoT system 400 may include a computing device 440 working as an information processing hub. The computing device 440 may receive input data from first sensors 410 (e.g., corresponding to sensors in 210 in FIG. 2) and second sensors 420 (e.g., corresponding to the AI sensors 240 in FIG. 2). In some embodiments, these sensors may continuously transmit sensor data at millisecond level to the computing device 440 for process. For illustrative purposes, the machine learning models 452, 454, and 456 in the IoT system 400 may be trained as the machine learning models 352, 354, and 356 in the IoT system 300 in FIG. 3.

In comparison with the single-compartment food container use case in FIG. 3, the multi-compartment food container use case in FIG. 4 may require additional data analysis in order to present the user with accurate food information. For instance, since the food container has multiple compartments, the IoT system 400 may need to determine the specific compartment from which a user takes food in order to accurately measure the weight of the food being taken. As another example, the multiple compartments in the food container may store different types of food, the IoT system 400 may need to automatically recognize which type of food is being taken by the user in order to offer accurate food information to the user.

In some embodiments, the IoT system 400 may install a plurality of load cell sensors 410 to measure weight readings at different locations of the multi-compartment food container. For instance, the load cell sensors 410 may be installed at the corners of a frame supporting the food container.

In some embodiments, after the computing device 440 receives first sensor data and second sensor data respectively from the load cell sensors 410 and the second sensor 420 at step 442, it may first determine the configuration of the food container, such as the number of compartments, the layout of the compartments, and the food information of the food in each compartment. For example, an image capturing the food container may be analyzed by a container recognition ML model to determine the configuration of the food container, and by the food recognition ML model 454 to determine the food information of the food in each compartment. In some cases, the container recognition ML model and the food recognition ML model 454 may be jointly trained as they are both image recognition models. The food information of the food in the plurality of compartments may be displayed to the user according to the layout information of the food container, so that the user is informed the food information of the food in each of the plurality of compartments.

Subsequently, the computing device 440 may determine one of the multiple compartments from which the food was taken based on the first sensor data at step 445. For instance, based on the sequences of weight readings from the plurality of load cell sensors 410, the weight changes at the corners of the food container may be measured. Based on the weight changes, the computing device 440 may construct a plurality of weight fluctuation patterns corresponding to the plurality of corners. Based on the plurality of weight fluctuation patterns, the weight pattern recognition ML model 452 may determine a food-taking probability for each compartment. The food-taking probability indicates a probability (may also be in a form of confidence score) that the user is taking food from the corresponding compartment.

In some embodiments, the computing device 440 may use the user action recognition ML model 456 to determine the one of the multiple compartments from which the food was taken based on the second sensor data at step 445. The second sensor data may include images capturing the configuration (a number of compartments and the layout of the compartments) of the food container and 3D images/videos capturing user actions. The user action recognition ML model 456 may, based on user action recognition techniques and the 3D images/videos, determine the compartment from which the user has taken food.

In some embodiments, the user action recognized by the user action recognition ML model 456 may be used to adjust the plurality of weight fluctuation patterns before the weight pattern recognition ML model 452 determines the weight of the food taken and the compartment from which the food was taken. For example, the adjustment may include removing (e.g., ignoring or compensating) weight changes from the weight fluctuation patterns that are unrelated to taking the food, such as lifting the serving utensil and placing back the serving utensil, from the weight readings. In other examples, the adjustment may include identifying and extracting the sections in the weight fluctuation patterns corresponding to the food-taking action only. As yet another example, a start timestamp and a completion timestamp of the food-taking action may be determined based on the user action, and the weight fluctuation patterns may be constructed only based on the weight sensor data collected between the start timestamp and the completion timestamp. This way, the weight fluctuation patterns exclude the weight changes caused by actions (e.g., operating the servicing utensil) that are not actually taking the food.

In some embodiments, the compartments determined by the weight pattern recognition ML model 452 and the user action recognition ML model 456 may be compared and consolidated. For example, if the compartments determined by the two machine learning models are inconsistent (e.g., different), the computing device 440 may select the compartment with a higher confidence score as the final decision. If the compartment determined by the user action recognition ML model 456 is preferred over the compartment determined by the weight pattern recognition ML model 452, the weight readings (e.g., the input used by the ML model 452) may be automatically collected as a new training sample. In some cases, the new training sample may be labeled with the compartment determined by the user action recognition ML model 456, or labeled manually. The new training sample will be used to retrain the weight pattern recognition ML model 452 to improve its accuracy. If the compartment determined by the weight pattern recognition ML model 452 is preferred over the compartment determined by the user action recognition ML model 456, the 3D images/videos (e.g., the input used by the ML model 456) may be automatically collected as a new training sample. In some cases, the new training sample may be labeled with the compartment determined by the weight pattern recognition ML model 452, or labeled manually. The new training sample will be used to retrain the user action recognition ML model 456 to improve its accuracy.

In some embodiments, the computing device 440 may determine a weight of the food taken by the user at step 446. The process is different from the step of 338 in FIG. 3 because the weight of the food needs to be determined based on multiple weight readings at multiple different locations. For example, if four load cell sensors are collecting weight readings from the four corners of the food container, the weight of the food being taken is a function of the four sequences of weight readings.

In some embodiments, this weight pattern recognition ML model 452 may also accept an extra input indicating the form of the food in order to accurately determine the weight being taken by the user. For example, the weight fluctuation patterns at four corners of the food container for taking 2 oz of liquid food (e.g., soup or juice) may be different from that of taking 2 oz of solid food because of liquid sloshing. Therefore, the training of the weight pattern recognition ML model 452 may have different training data sets collected for food of different forms. In some embodiments, the food forms may have different degrees, such as liquid form, semi-liquid form (e.g., porridge or congee), solid form with small chunks, solid form with large chunks.

In some embodiments, the training data may be collected from trials or experiments, for example, by taking a certain amount of a certain form of food from a random compartment and collecting the weight readings. Each piece of training data may include the form of the food, the multiple sequences of weight readings from the load cell sensors, and a label (the actual amount of food taken). By fitting the training data, the weight pattern recognition ML model 452 may explore the latent relationships between the form of the food, the weight changes at the corners of the food container (e.g., the multi-dimensional weight readings), and the weight of the food taken.

In some embodiments, the weight pattern recognition ML model 452 may be trained to determine both the compartment from which the food is taken and the weight information of the food being taken based on the same input (e.g., the multiple sequences of weight readings and the form of the food). In some embodiments, the weight pattern recognition ML model 452 may include two branches to output the respective determination, but these two branches may share the same embedding layer that constructs weight fluctuation patterns based on the multiple sequences of weight readings.

In some embodiments, the computing device 440 may determine portion-based food information of the food taken by the user from the compartment at step 447 using the food recognition ML model 454. For example, the computing device 440 may first identify the food in each of the plurality of compartments based on the food images (using the food recognition ML model 454) or a user selection (from an operator's selection on a management portal/display panel when placing the food container on to the IoT frame). Based on the identification, corresponding food information may be retrieved from a database. Some of the food information is per-weight-unit information, which may be used to determine the portion-based food information by multiplying with the weight of the food taken by the user. The process is similar to the step of 340 in FIG. 3 and is not repeated herein.

The computing device 440 may then proceed with displaying and storing the weight information and the portion-based food information at step 448 for the user to view. The display may occur at a local display panel 460 near the foodservice area, or a smart device carried by the user. The computing device 440 may also aggregate the information into a cloud server 470 for big data analysis.

Figure 5:
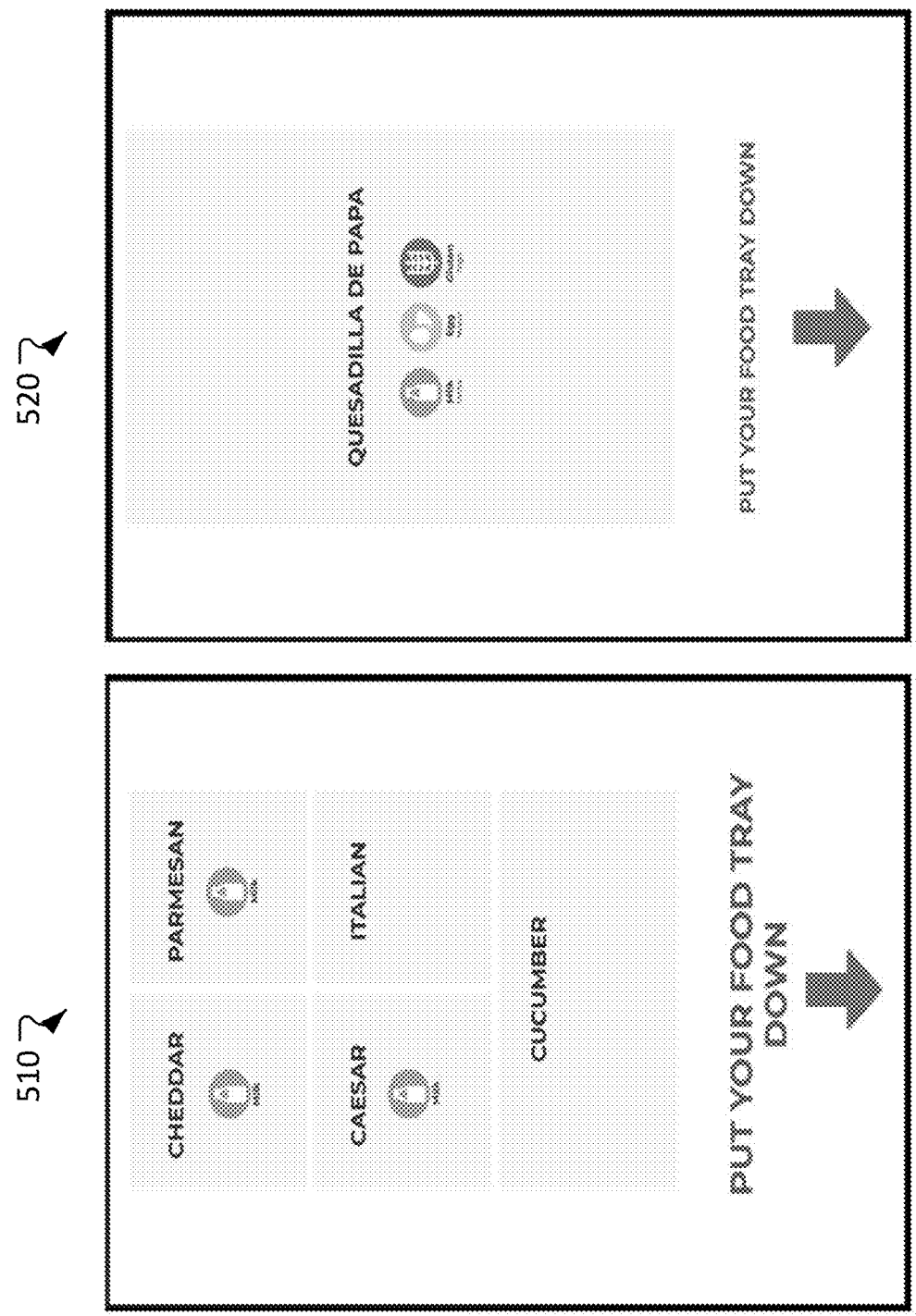
FIG. 5 illustrates an exemplary diagram of a user-interface (UI) design for IoT-based foodservice automation in accordance with some embodiments.

FIG. 5 illustrates an exemplary diagram of a user-interface (UI) design for IoT-based foodservice automation in accordance with some embodiments. The UI design is merely for illustrative purposes, and may be implemented in other ways to convey the same or different information.

The UI of the IoT system described in FIGS. 1-4 (such as 200) may include a display panel that may be configured to display different screens. As shown, on a first screen 510, the configuration of a multi-compartment food container and the food information of the food in each compartment are displayed for the user. In addition, a message "PUT YOUR FOOD TRAY DOWN" may be displayed to remind the user to put his/her food tray down so that the tag data of the RFID transponder coupled to (e.g., attached to or built-in) the food tray may be read.

After the user takes food from a compartment, the food information of the food may be displayed on a second screen 520. The food information may include the name of the food, ingredients, allergen, or other nutrition information. In some cases, the message "PUT YOUR FOOD TRAY DOWN" may also be displayed to remind the user to keep the food tray down for RFID scanning.

In some embodiments, the display panel may also be used to display other messages for the user, such as notifying the user with certain issues in the ordering/food-taking process. The issues may include: the ladle or tang (or other utensil) is not returned to its original location in the food container, or the user moves the utensil from one compartment to another without taking any food.

In some embodiments, the IoT system may use the same display panel or a different display panel for food operators to set up the food information. For example, after an food operator places a multi-compartment food container on the IoT frame, the AI cameras may capture one or more images of the food container and perform food identification (on the AI cameras or by sending the images to a server to perform the identification). For each of the compartments in the food container, the output of the food identification may include one or more candidates that are similar to the food in the compartment. These candidates may be listed on the display panel for the food operator to select (e.g., from a drop down menu) or make certain changes or corrections.

In some embodiments, a user and a food operator may share the same display panel with different access controls. For example, the food operator may scan his/her badge on the RFID reader or enter his/her admin passcode so that the IoT system knows that it is an operator action rather than a user action. The display panel may be display-only for the users but may support both input and output functionalities for food operators. For example, when food is running out in a compartment, the operator may be automatically notified to prepare a replenishment. The IoT system may automatically detect, e.g., via the weight sensors and the AI cameras, a compartment approaching empty state based on the observed consumption rate (e.g., the speed of weight reduction) and the remaining amount of food in the compartment. The IoT system may alert the food service operators through the cloud server's admin portal and its built-in notification mechanism such as the dashboard, mobile SMS etc.

Figure 6:
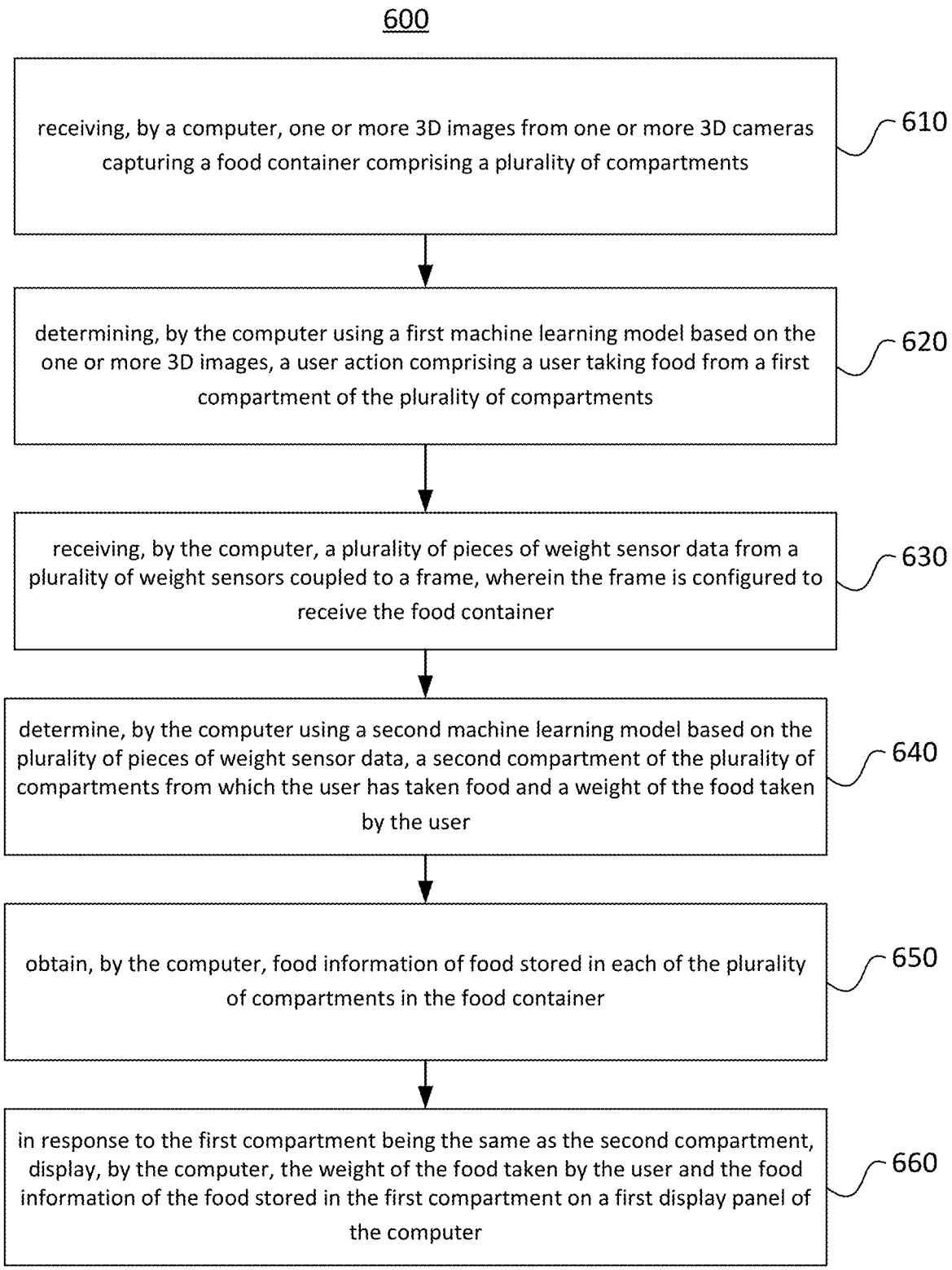
FIG. 6 illustrates an exemplary method for IoT-based foodservice automation in accordance with some embodiments.

FIG. 6 illustrates an exemplary method 600 for IoT-based foodservice automation in accordance with some embodiments. Method 600 may be performed by a computer device, apparatus, or system. The method 600 may be performed by one or more modules/components of the environment or system illustrated by FIGS. 1A-5. The operations of the method 600 presented below are intended to be illustrative. Depending on the implementation, the method 600 may include additional, fewer, or alternative steps performed in various orders or parallel.

Block 610 includes receiving, by a computer, one or more images from one or more cameras capturing a food container comprising a plurality of compartments.

Block 620 includes determining, by the computer using a first machine learning model based on the one or more images, a user action comprising a user taking food from a first compartment of the plurality of compartments. In some embodiments, the user action further comprises one or more of the following: lifting a serving utensil from the food container, stirring the food using the serving spoon, dropping food into the food container, or placing the serving utensil back into the food container.

Block 630 includes receiving, by the computer, a plurality of pieces of weight sensor data from a plurality of weight sensors coupled to a frame, wherein the frame is configured to receive the food container.

Block 640 includes determining, by the computer using a second machine learning model based on the plurality of pieces of weight sensor data, a second compartment of the plurality of compartments from which the user has taken food and a weight of the food taken by the user. In some embodiments, the second compartment and the weight of the food taken by the user may be determined by: constructing a plurality of weight fluctuation patterns respectively based on the plurality of pieces of weight sensor data; adjusting the plurality of weight fluctuation patterns based on the user action, wherein the plurality of adjusted weight fluctuation patterns indicate a plurality of weight changes at a plurality of corners of the food container; and feeding the plurality of adjusted weight fluctuation patterns to the second machine learning model, wherein the second machine learning model is a pattern recognition model trained to determine, based on a plurality of weight changes at a plurality of corners of the food container, (1) the weight of the food taken out from the food container and (2) one of the plurality of compartments from which the food was taken. In some embodiments, the constructing the plurality of weight fluctuation patterns includes: identifying a start timestamp and a completion timestamp of the user action; and constructing the plurality of weight fluctuation patterns based on the weight sensor data collected between the start timestamp and the completion timestamp.

Block 650 includes obtaining, by the computer, food information of food stored in each of the plurality of compartments in the food container. In some embodiments, the food information comprises one or more of the following: a name; ingredient information; nutrition information; pricing information; or allergen information. In some embodiments, the food information comprises one or more pieces of per-weight-unit food information of the food.

Block 660 includes in response to the first compartment being the same as the second compartment, displaying, by the computer, the weight of the food taken by the user and the food information of the food stored in the first compartment on a first display panel of the computer.

In some embodiments, the method 600 may further include: determining portion-based food information of the food taken by the user based on the weight of the food taken by the user and the food information of the food stored in the first compartment; and displaying the portion-based food information.

In some embodiments, the method 600 may further include determining the portion-based food information by multiplying the weight of the food taken by the user and each of the one or more pieces of food information of the food.

In some embodiments, the obtaining the food information of food stored in each of the plurality of compartments in the food container includes: obtaining an identification of food stored in each of the plurality of compartments from a user selection on a display panel that is inaccessible to the user; and retrieving, based on the identification of the food, the corresponding food information.

In some embodiments, the obtaining the food information of food stored in each of the plurality of compartments in the food container includes: obtaining a plurality of labeled images of food as training data; training, using a supervised training algorithm, a neural network based on the training data for food identification; obtaining an identification of the food in each of the plurality of compartments by feeding the one or more images into the trained neural network; and retrieving, based on the identification of the food, the corresponding food information.

In some embodiments, the method 600 may further include identifying a layout of the plurality of compartments in the food container based on the one or more images; and displaying the food information of the food in the plurality of compartments according to the layout of the plurality of compartments.

In some embodiments, the method 600 may further include, in response to the first compartment being different from the second compartment, select one compartment from the first compartment and the second compartment based on respective confidence scores; determine portion-based food information of the food taken by the user based on the weight of the food taken by the user and the food information of the food stored in the selected compartment; and display the weight of the food taken by the user and the portion-based food information of the food taken by the user.

In some embodiments, the method 600 may further include, if the selected compartment is the first compartment: collect the weight sensor data as new training data; label the new training data with the selected compartment; and retrain the second machine learning model based on the new training data.

In some embodiments, the method 600 may further include, if the selected compartment is the second compartment: collect the one or more images as the new training data; label the new training data with the selected compartment; and retrain the first machine learning model based on the new training data.

Figure 7:
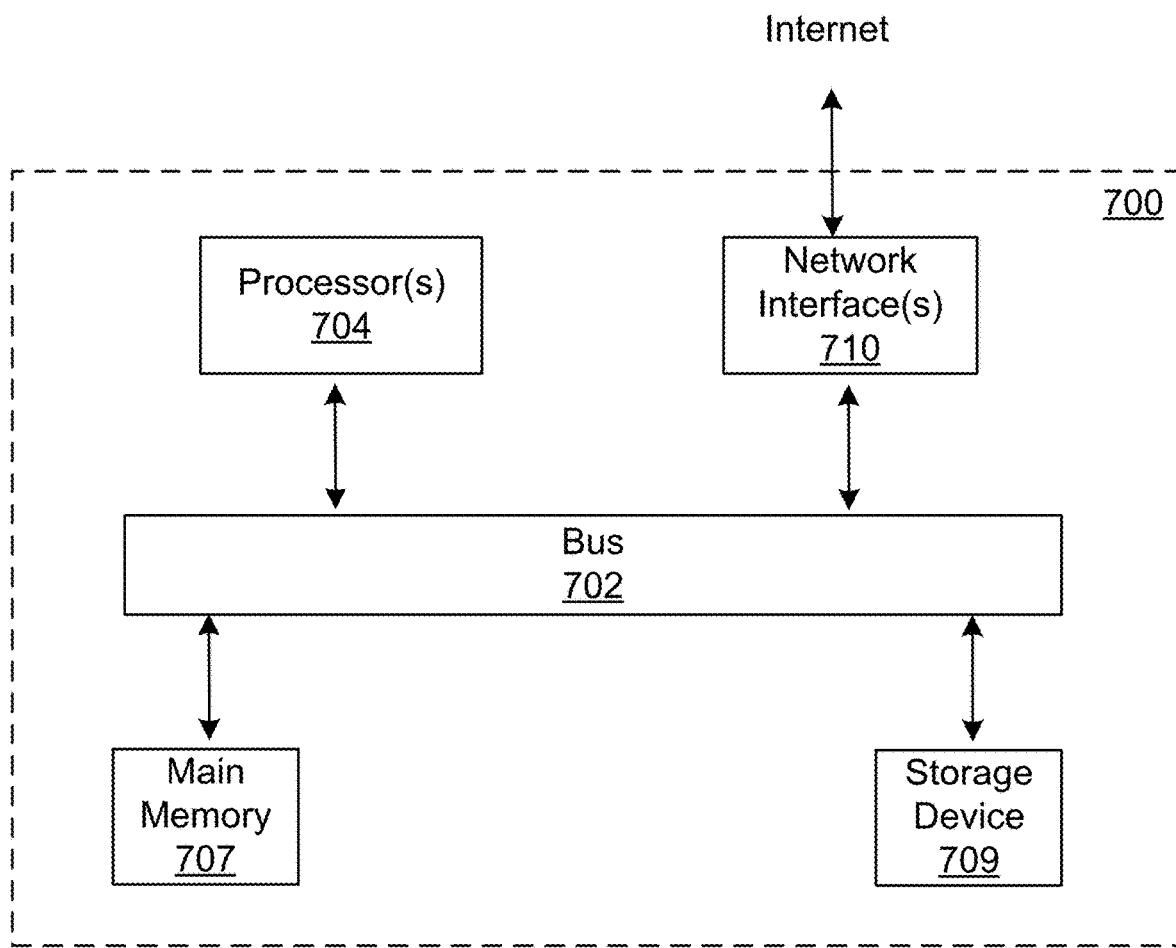
FIG. 7 illustrates an example computing device in which any of the embodiments described herein may be implemented.

FIG. 7 illustrates an example computing device in which any of the embodiments described herein may be implemented. The computing device may be used to implement one or more components of the systems and the methods shown in FIGS. 1A-6 The computing device 700 may comprise a bus 702 or other communication mechanism for communicating information and one or more hardware processors 704 coupled with bus 702 for processing information. Hardware processor(s) 704 may be, for example, one or more general purpose microprocessors.

The computing device 700 may also include a main memory 707, such as a random-access memory (RAM), cache and/or other dynamic storage devices, coupled to bus 702 for storing information and instructions to be executed by processor(s) 704. Main memory 707 also may be used for storing temporary variables or other intermediate information during execution of instructions to be executed by processor(s) 704. Such instructions, when stored in storage media accessible to processor(s) 704, may render computing device 700 into a special-purpose machine that is customized to perform the operations specified in the instructions. Main memory 707 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 700 may implement the techniques described herein using customized hard-wired logic, one or more ASICs or FPGAs, firmware and/or program logic which in combination with the computing device may cause or program computing device 700 to be a special-purpose machine. According to one embodiment, the techniques herein are performed by computing device 700 in response to processor(s) 704 executing one or more sequences of one or more instructions contained in main memory 707. Such instructions may be read into main memory 707 from another storage medium, such as storage device 709. Execution of the sequences of instructions contained in main memory 707 may cause processor(s) 704 to perform the process steps described herein. For example, the processes/methods disclosed herein may be implemented by computer program instructions stored in main memory 707. When these instructions are executed by processor(s) 704, they may perform the steps as shown in corresponding figures and described above. In alternative embodiments, hard-wired circuitry may be used in place of or in combination with software instructions.

The computing device 700 also includes a communication interface 710 coupled to bus 702. Communication interface 710 may provide a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each process, method, and algorithm described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such an algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A system for foodservice, comprising:
a frame having a plurality of weight sensors distributed at corners of the frame, wherein the frame is configured to receive a food container comprising a plurality of compartments;
one or more cameras comprising one or more of the following: a depth sensor, a time of flight (ToF) camera, or a Light Detection and Ranging (LiDAR) camera, wherein the one or more cameras are directed to the food container to monitor the food container; and
one or more processors coupled to the plurality of weight sensors and the one or more cameras, the one or more processors being configured to:
receive one or more images from the one or more cameras capturing the food container;
determine, using a first machine learning model based on the one or more images, a user action comprising the user taking food from a first compartment of the plurality of compartments;
receive a plurality of pieces of weight sensor data from the plurality of weight sensors coupled to the frame;
determine, using a second machine learning model based on the plurality of pieces of weight sensor data, a second compartment of the plurality of compartments from which the user has taken food and a weight of the food taken by the user;
obtain food information of food stored in each of the plurality of compartments in the food container; and
in response to the first compartment being the same as the second compartment, display the weight of the food taken by the user and the food information of the food stored in the first compartment on a first display panel.

2. The system of claim 1, wherein the user action further comprises one or more of the following:
lifting a serving utensil from the food container,
stirring the food using a serving spoon,
dropping food into the food container, or
placing the serving utensil back into the food container.

3. The system of claim 1, wherein to determine the second compartment from which the user has taken food and the weight of the food taken by the user, the one or more processors are configured to:
construct a plurality of weight fluctuation patterns respectively based on the plurality of pieces of weight sensor data;
adjust the plurality of weight fluctuation patterns based on the user action, wherein the plurality of adjusted weight fluctuation patterns indicate a plurality of weight changes at a plurality of corners of the food container; and
feed the plurality of adjusted weight fluctuation patterns to the second machine learning model, wherein the second machine learning model is a pattern recognition model trained to determine, based on a plurality of weight changes at a plurality of corners of the food container, (1) the weight of the food taken out from the food container and (2) one of the plurality of compartments from which the food was taken.

4. The system of claim 3, wherein to construct the plurality of weight fluctuation patterns based on the weight sensor data, the one or more processors are configured to:
identify a start timestamp and a completion timestamp of the user action; and
construct the plurality of weight fluctuation patterns based on the weight sensor data collected between the start timestamp and the completion timestamp.

5. The system of claim 1, wherein the food information comprises one or more of the following:
a name;
ingredient information;
nutrition information;
pricing information; or
allergen information.

6. The system of claim 1, wherein the one or more processors are further configured to:
determine portion-based food information of the food taken by the user based on the weight of the food taken by the user and the food information of the food stored in the first compartment; and
display the portion-based food information.

7. The system of claim 6, wherein the food information comprises one or more pieces of per-weight-unit food information of the food, and
to determine the portion-based food information, the one or more processors are configured to:
determine the portion-based food information by multiplying the weight of the food taken by the user and each of the one or more pieces of food information of the food.

8. The system of claim 6, further comprising:
a first radio-frequency identification (RFID) reader configured to read tag data from an RFID tag associated with a user account,
wherein the one or more processors are further configured to:
receive the tag data when the RFID tag is scanned by the first RFID reader; and
store, based on the tag data, the weight and the portion-based food information of the food taken by the user into the user account.

9. The system of claim 1, wherein to obtain the food information of food stored in each of the plurality of compartments in the food container, the one or more processors are configured to:
obtain an identification of food stored in each of the plurality of compartments from a user selection on a display panel that is inaccessible to the user; and
retrieve, based on the identification of the food, the corresponding food information.

10. The system of claim 1, wherein to obtain the food information of food stored in each of the plurality of compartments in the food container, the one or more processors are configured to:
obtain a neural network for food identification, wherein the neural network is trained using supervised learning based on a plurality of labeled images of food as training data;

obtain an identification of the food in each of the plurality of compartments by feeding the one or more images into the neural network; and retrieve, based on the identification of the food, the corresponding food information.

11. The system of claim 1, wherein the one or more processors are further configured to:
   identify a layout of the plurality of compartments in the food container based on the one or more images; and
   display the food information of the food in the plurality of compartments according to the layout of the plurality of compartments.

12. The system of claim 1, wherein the one or more processors are further configured to:
   in response to the first compartment being different from the second compartment, select one compartment from the first compartment and the second compartment based on respective confidence scores;
   determine portion-based food information of the food taken by the user based on the weight of the food taken by the user and the food information of the food stored in the selected compartment; and
   display the weight of the food taken by the user and the portion-based food information of the food taken by the user.

13. The system of claim 12, wherein the one or more processors are further configured to:
   if the selected compartment is the first compartment:
      collect the weight sensor data as new training data;
      label the new training data with the selected compartment; and
      retrain the second machine learning model based on the new training data.

14. The system of claim 12, wherein the one or more processors are further configured to:
   if the selected compartment is the second compartment:
      collect the one or more images as new training data;
      label the new training data with the selected compartment; and
      retrain the first machine learning model based on the new training data.

15. The system of claim 12, further comprising:
   a second RFID reader configured to read tag data from an RFID tag associated with a user account,
   wherein the one or more processors are further configured to:
      receive the tag data when the RFID tag is scanned by the second RFID reader;
      retrieve, from the user account, all information of the food that has been taken by the user; and
      display the retrieved information on a second display panel corresponding to the second RFID reader.

16. The system of claim 1, further comprising:
   one or more temperature sensors coupled to the frame,
   wherein the one or more processors are further configured to:
      receive temperature sensor data from the one or more temperature sensors; and
      compensate the weight sensor data based on the temperature sensor data.

17. The system of claim 1, further comprising:
   one or more humidity sensors coupled to the frame,
   wherein the one or more processors are further configured to:
      receive humidity sensor data from the one or more humidity sensors; and
      compensate the weight sensor data based on the humidity sensor data.

18. The system of claim 1, wherein the one or more processors are further configured to:
   send the weight of the food taken by the user, the food information of the food taken by the user, a current time, and an identification associated with the user to a cloud server for dietary data aggregation and tracking.

* * * * *